US011807452B2

(12) United States Patent
Fjeldheim et al.

(10) Patent No.: US 11,807,452 B2
(45) Date of Patent: Nov. 7, 2023

(54) AUTOMATED STORAGE AND RETRIEVAL SYSTEM

(71) Applicant: Autostore Technology AS, Nedre Vats (NO)

(72) Inventors: Ivar Fjeldheim, Haugesund (NO); Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 564 days.

(21) Appl. No.: 16/765,482

(22) PCT Filed: Nov. 20, 2018

(86) PCT No.: PCT/EP2018/081892
§ 371 (c)(1),
(2) Date: May 20, 2020

(87) PCT Pub. No.: WO2019/101725
PCT Pub. Date: May 31, 2019

(65) Prior Publication Data
US 2020/0290804 A1    Sep. 17, 2020

(30) Foreign Application Priority Data

Nov. 23, 2017   (NO) .................................. 20171874

(51) Int. Cl.
B65G 1/04         (2006.01)
B65G 60/00        (2006.01)
(Continued)

(52) U.S. Cl.
CPC ........... B65G 1/0464 (2013.01); B65G 60/00 (2013.01); B66F 9/063 (2013.01); B66F 9/24 (2013.01)

(58) Field of Classification Search
CPC ....... B65G 1/0464; B65G 60/00; B66F 9/063; B66F 9/24
See application file for complete search history.

(56) References Cited

U.S. PATENT DOCUMENTS

2008/0075569 A1    3/2008  Benedict et al.
2015/0332948 A1   11/2015  Ikeda et al.
(Continued)

FOREIGN PATENT DOCUMENTS

CN    104781163    7/2015
CN    105517923    4/2016
(Continued)

OTHER PUBLICATIONS

Office Action dfrom China Intellectual Property Office dated Mar. 22, 2021 (submitted inter alia as a statement of relevance for any non-English references cited therein).
(Continued)

Primary Examiner — Saul Rodriguez
Assistant Examiner — Ashley K Romano
(74) Attorney, Agent, or Firm — Osha Bergman Watanabe & Burton LLP

(57) ABSTRACT

The invention concerns an automated storage and retrieval system (1), a storage container handling vehicle (3) and a method for operating such a system. The system (1) comprises one or more vehicle (3) configured to lift and move storage containers (106) stacked in the system (1). Each vehicle (3) comprises a storage container lifting device (16), a drive system (18) with a wheel arrangement (19, 20) configured to drive and maneuver the vehicle (3) along the track system (108), abase (31) onto which the wheel arrangement (19, 20) is connected, a rotational part (30) rotationally connected via a swivel device (32) to the base
(Continued)

(31) and a rotational drive system (34) for rotating the rotational part (30) relative to the base (31).

13 Claims, 14 Drawing Sheets

(51) Int. Cl.
  *B66F 9/06* (2006.01)
  *B66F 9/24* (2006.01)

(56) References Cited

U.S. PATENT DOCUMENTS

| | | | |
|---|---|---|---|
| 2016/0016732 A1 | 1/2016 | Koide et al. | |
| 2016/0340122 A1 | 11/2016 | Lindblom | |
| 2017/0121109 A1 | 5/2017 | Behling | |
| 2021/0188549 A1* | 6/2021 | Fjeldheim | B65G 59/02 |
| 2021/0206571 A1* | 7/2021 | Austrheim | B65G 1/0414 |
| 2021/0214163 A1* | 7/2021 | Deacon | B65G 1/1378 |
| 2021/0299704 A1* | 9/2021 | Bell | B07C 3/008 |
| 2021/0300678 A1* | 9/2021 | Van Buijtene | F16G 13/20 |
| 2021/0354925 A1* | 11/2021 | Durai | B65G 1/0485 |
| 2021/0403237 A1* | 12/2021 | Austrheim | B65G 1/0478 |

FOREIGN PATENT DOCUMENTS

| | | |
|---|---|---|
| CN | 105947514 | 9/2016 |
| CN | 106029529 | 10/2016 |
| EP | 3192751 | 7/2017 |
| JP | H101944410 | 7/1998 |
| JP | H11-180300 A | 7/1999 |
| JP | 2016-183050 A | 10/2016 |
| NO | 317366 B1 | 10/2004 |
| WO | WO 98/55381 A1 | 10/1998 |
| WO | WO2013167907 | 11/2013 |
| WO | 2014/075937 A1 | 5/2014 |
| WO | 2014/090684 A1 | 6/2014 |
| WO | 2015/104263 A2 | 7/2015 |
| WO | 2015/193278 A1 | 12/2015 |
| WO | 2016/039023 A1 | 3/2016 |
| WO | 2016/120075 A1 | 8/2016 |
| WO | WO2016172793 | 11/2016 |
| WO | 17081275 | 5/2017 |
| WO | WO2017/081281 | 5/2017 |
| WO | 17129384 | 8/2017 |
| WO | WO2017/148939 | 9/2017 |
| WO | WO2017150005 | 9/2017 |

OTHER PUBLICATIONS

Office Action issued in the counterpart Japanese Patent Application No. 2020-528336, dated Jul. 22, 2022 (10 pages).

* cited by examiner

AUTOMATED STORAGE AND RETRIEVAL SYSTEM

TECHNICAL FIELD

The present invention relates to an automated storage and retrieval system, a vehicle for lifting and transporting storage containers stacked in stack within the system and a method thereof.

BACKGROUND AND PRIOR ART

FIG. 1 discloses a typical prior art automated storage and retrieval system 1 with a framework structure 100 and FIGS. 2 and 3 discloses two different prior art container handling vehicles 201,301 suitable for operating on such a system 1.

The framework structure 100 comprises a number of upright members 102 and a number of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. Each storage container 106 may typically hold a plurality of product items (not shown), and the product items within a storage container 106 may be identical, or may be of different product types depending on the application. The storage grid 104 guards against horizontal movement of the stacks 107 of storage containers 106, and guides vertical movement of the containers 106, but does normally not otherwise support the storage containers 106 when stacked.

The automated storage and retrieval system 1 comprises a rail system 108 arranged in a grid pattern across the top of the storage columns 105, on which rail system 108 a plurality of container handling vehicles 201,301 are operated to raise storage containers 106 from and lower storage containers 106 into the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. In this way, the rail system 108 defines grid columns 112 above which the container handling vehicles 201,301 can move laterally above the storage columns 105, i.e. in a plane which is parallel to the horizontal X-Y plane.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. Each set of wheels 201b,301b 201c,301c can be lifted and lowered, so that the first set of wheels 201b,301b and/or the second set of wheels 201c, 301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the embodiment disclosed in FIG. 1, Z=8 identifies the lowermost, bottom layer of the grid 104. Consequently, as an example, and using the Cartesian coordinate system X, Y, Z indicated in FIG. 1, the storage container identified as 106' in FIG. 1 can be said to occupy grid location or cell X=10, Y=2, Z=3. The container handling vehicles 201,301 can be said to travel in layer Z=0 and each grid column 112 can be identified by its X and Y coordinates.

Each prior art container handling vehicle 201,301 comprises a storage compartment or space for receiving and stowing a storage container 106 when transporting the storage container 106 across the grid 104. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicles 301 with a cantilever construction. Such a vehicle is described in detail in e.g. NO317366, the contents of which are also incorporated herein by reference.

The central cavity container handling vehicles 201 shown in FIG. 2 may have a footprint, i.e. an extent in the X and Y directions, which is generally equal to the lateral or horizontal extent of a grid column 112, i.e. the extent of a grid column 112 in the X and Y directions, e.g. as is described in WO2015/193278A1, the contents of which are incorporated herein by reference.

Alternatively, the central cavity container handling vehicles 101 may have a footprint which is larger than the lateral extent of a grid column 112, e.g. as is disclosed in WO2014/090684A1.

The rail system 108 may be a single rail system, as is shown in FIG. 4. Alternatively, the rail system 108 may be a double rail system, as is shown in FIG. 5, thus allowing a container handling vehicle 201,301 having a footprint generally corresponding to the lateral extent of a grid column 112 to travel along a row of grid columns even if another container handling vehicle 101 is positioned above a grid column neighboring that row. Both the single and double rail system forms a grid pattern in the horizontal plane P comprising a plurality of rectangular and uniform grid locations or grid cells 122, where each grid cell 122 comprises a grid opening 115 being delimited by a pair of tracks 110a,110b of the first tracks 110 and a pair of tracks 111a,111b of the second set of tracks 111. In FIG. 5 the grid cell 122 is indicated by a dashed box.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122.

In a storage grid 104, a majority of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 201,301 can drop off and/or pick up storage containers 106 so that they can be transported to an access station (not shown) where the storage containers 106 can be access from outside of the grid 104 or transferred out of or into the grid 104. Within the art, such a location is normally referred to as a 'port' and the grid column 112 in which the port is located may be referred to as a port column 119,120.

The grid 104 in FIG. 1 comprises two port columns 119 and 120. The first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported to the grid 104 from an access or a transfer station.

The access station may typically be a picking or a stocking station where product items are removed from or positioned into the storage containers 106. In a picking or a stocking station, the storage containers 106 are normally never removed from the automated storage and retrieval system 1, but are returned into the grid 104 once accessed. A port can also be used for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 119,120 and the access station.

If the ports 119,120 and the access station are located at different levels, the conveyor system may comprise a lift device with a vertical component for transporting the storage containers 106 vertically between the port 119,120 and the access station.

The conveyor system may be arranged to transfer storage containers 106 between different grids, e.g. as is described in WO2014/075937A1, the contents of which are incorporated herein by reference.

When a storage container 106 stored in the grid 104 disclosed in FIG. 1 is to be accessed, one of the container handling vehicles 201,301 is instructed to retrieve the target storage container 106 from its position in the grid 104 and transport it to the drop-off port 119. This operation involves moving the container handling vehicle 201,301 to a grid location above the storage column 105 in which the target storage container 106 is positioned, retrieving the storage container 106 from the storage column 105 using the container handling vehicle's 201,301 lifting device (not shown), and transporting the storage container 106 to the drop-off port 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 201,301 is instructed to pick up the storage container 106 from the pick-up port 120 and transport it to a grid location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the grid 104, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system which typically is computerized and which typically comprises a database for keeping track of the storage containers 106.

WO2016/120075A1, the contents of which are incorporated herein by reference, shows an example of an automated storage and retrieval system using vehicles with a central cavity. The disclosed container handling vehicles are dimensioned so that they have a footprint, i.e. a contact area against the track system, which has a horizontal extent that is equal to the horizontal extent of a grid cell. Within the art, such a container handling vehicle, i.e. a container handling vehicle having a footprint with a horizontal extent corresponding to the horizontal extent of a single grid cell, is sometimes referred to as a "single cell" container handling vehicle. Another single cell container handling vehicle is disclosed in WO2015/193278A1, the contents of which are incorporated herein by reference.

The single cell design disclosed in e.g. WO2016/120075A1 and WO2015/193278A1 reduces the space required for the container handling vehicles to travel on the track system, thus allowing more vehicles to operate on the track system without interfering with each other. Further, the stability of the vehicle operation is increased compared to a cantilever vehicle as disclosed in e.g. NO317366.

A problem with prior art automated storage and retrieval systems using storage container vehicles with single cell design is that these vehicles necessitate a vehicle body having a container receiving cavity that must be open towards the underlying storage grid. Strict space constraints are therefore set as to the locations and sizes of necessary vehicle components, e.g. lifting devices and wheel displacement means. To maximize the horizontal cross section of the cavity, at least some of the vehicle components of the prior art single cell vehicles are arranged above the cavity (see e.g. WO 2015/193278 A1) and/or within the wheels (see e.g. WO 2016/120075 A1), a solution that results in high complexity and cost compared with the earlier cantilever vehicle design disclosed in NO317366. Moreover, to minimize the height and the total weight of the vehicle, the size of components such as motors and batteries should in the 'single cell' vehicles be minimized in size and/or restricted to light weight materials, criteria that limit the maximum achievable operation efficiency of the vehicle such as the maximum lifting power available for the storage container lifting device. Bulky components may be arranged above the cavity by increasing the total height of the vehicle. However, such an increased height would result in an undesired decrease in overall vehicle stability in addition to increased cost.

The cantilever vehicle disclosed in NO317366 may contain components such as motor and batteries being considerably larger than the 'single cell' vehicle. But the cantilever vehicles have the disadvantage of protruding beyond the footprint of the vehicle, i.e. into a neighboring grid cell. This will prevent other container handling vehicles from operating on the neighboring grid cell, thus limiting the space available for other container handling vehicles to operate on the track system. Due to the cantilever design, these prior art vehicles have the additional disadvantage that they may lift storage containers from one direction in the horizontal plane only, thereby necessitating a high degree of maneuvering on the track system during 'digging' operations and transport to port. Moreover, the cantilever design forces these vehicles to ports and/or boundary grid columns arranged at one particular side of the storage grid, thereby further reducing the overall efficiency of the system.

In view of the above, it is desirable to provide a vehicle operating on an automated storage and retrieval system, and a method thereof, that solves or at least mitigates one or more of the aforementioned problem related to use of prior art storage and retrieval systems.

SUMMARY OF THE INVENTION

The present invention is set forth and characterized in the main claims, while the dependent claims describe other characteristics of the invention.

In particular, the invention concerns an automated storage and retrieval system comprising a track system comprising a first set of parallel tracks arranged in a horizontal plane (P) and extending in a first direction (X) and a second set of parallel tracks arranged in the horizontal plane (P) and extending in a second direction (Y) which is orthogonal to the first direction (X). The first and second sets of tracks form a grid pattern in the horizontal plane (P) comprising a plurality of adjacent grid cells, each comprising a grid opening defined by a pair of neighboring tracks of the first set of tracks and a pair of neighboring tracks of the second set of tracks. The system further comprises a plurality of stacks of storage containers arranged in storage columns located beneath the track system, wherein each storage column is located vertically below a grid opening and one or more vehicles, each comprising a storage container lifting device for lifting and lowering storage containers stacked in the stacks, a drive system comprising a wheel arrangement, a base/Base onto which the wheel arrangement is connected, a rotational part rotationally connected via a swivel device to the base having a rotational axis (R) preferably directed perpendicular to the horizontal plane (P) and preferably a rotational drive system for rotating the rotational part relative to the base. The drive system is configured to drive the vehicle along the track system in the first direction (X), the second direction (Y) or both. The storage container lifting device is preferably connected to the rotational part.

The vehicle may advantageously also comprise one or more registration devices configured for acquiring any information related to content/items within a storage container situated on top of a stack during operation, for example any recording device such as a camera that allows acquisition of live and/or still images of contents within any storage containers. The registration device should be arranged such that free sight towards the track system is ensured at least part of the operational time of the vehicle, for example when the vehicle is void of any storage containers.

Alternatively, or in addition, the vehicle may further comprise one or more dedicated registration devices for acquiring data related to the position of the vehicle relative to the track system during operation. As for the registration device(s) for the content of the storage containers, positional registration device(s) should also be arranged on the vehicle such that free sight towards the track system is ensured at least part of vehicle's operational time. Example of locations for both type of registration devices is on the rotational part and/or the base and/or the wheel arrangement. A registration device is herein defined as any device that may acquire positional and/or visual information of the environment surrounding the vehicle.

The possibility to rotate the rotational part relative to the base and the wheel arrangements increases the possible registration/sweeping area of the vehicle.

The rotational part preferably further comprises a bulk section rotationally connected to the base and a protruding section extending horizontally in the first direction (X) from the bulk section to form a container receiving space confined in height by the vertical distance from the track system to the protruding section and in the horizontal plane (P) to the horizontal extent of the protruding section. In this particular configuration, the storage container lifting device is arranged at least partly below the protruding section. The above-mentioned registration device(s) may for this design be arranged on the sides and/or beneath the protruding section, for example connected to the storage container lifting device. The latter exemplary position is particularly relevant in case of registration device(s) such as a camera allowing live and/or still images of content within a storage container.

In addition to a protruding section extending horizontally in the first direction (X) from the bulk section the vehicle may also in another embodiment comprise a second protruding section extending horizontally in the first direction (X) from the bulk section opposite of the first protruding section, forming a second container receiving space with the same confined in height and in the horizontal plane (P) as for the first container receiving space. As for the first protruding section, the storage container lifting device may be arranged at least partly beneath the second protruding section. This particular embodiment including two or more protruding sections enables handling of a plurality of storage containers in each operation, thereby increasing the rate storage containers may be handled relative to the above mentioned prior art vehicles with cantilever design or 'single cell' design when operating the above-mentioned storage and retrieval system.

In an advantageous configuration the drive system comprises a first wheel arrangement configured to guide the vehicle along the track system in the first direction (X). The first wheel arrangement comprises preferably four wheels or two belts arranged with their rotational axes in the second direction (Y). Further, in order to increase the overall stability of the vehicle during operation, i.e. transport and storage container handling, the first wheel arrangement may have a length in the first direction (X) that is longer than the distance between a pair of neighboring track of the second set of tracks.

However, such an increased stability may also be achieved by adding additional weight to the bulk section. The latter alternative may be preferable in order keep the drive system within a footprint of grid cell, thereby allowing other vehicles to pass on all neighboring grid cells if there is synchronized rotation of the rotational part. For example, when a vehicle is approaching a neighboring grid cell into which another vehicle's protruding section is extended, the rotational part of the latter vehicle may rotate at least 90° in order to clear the drive path of the former vehicle.

The drive system may further comprise a second wheel arrangement configured to guide the vehicle along the track system in the second direction (Y). As for the first wheel arrangement, the second wheel arrangement comprises preferably four wheels or two belts arranged with their rotational axes in the first direction (X). The second wheel arrangement have preferably a length in the second direction (Y) being equal or shorter than the distance between a pair of neighboring track of the first set of tracks.

In another advantageous configuration the vehicle further comprises a replaceable power source coupled to the rotational part, for example a replaceable power source with a corresponding charging station as described and illustrated in patent publication WO 2015/104263 A2.

The invention also concerns a vehicle suitable for lifting and transporting storage containers stacked in stacks within the above disclosed automated storage and retrieval system. The inventive vehicle is configured to move on the track system above the storage columns and comprises a storage container lifting device for lifting storage containers stacked in the stacks, a drive system comprising a wheel arrangement, a base onto which the wheel arrangement is connected, a rotational part rotationally connected via a swivel device to the base and a rotational drive system for rotating the rotational part relative to the base. The drive system is configured to drive the vehicle along the track system in at least one of the first direction (X) and the second direction (Y).

The invention also concerns a method of operating an automated storage and retrieval system as described above, where method comprises the steps of:
  selecting/identifying, by for example entering one or more particular items in a dedicated software, a target storage container within a target storage column comprising the target storage container with the particular item(s) and at least one non-target storage container,
  operating the drive system to maneuver the vehicle in the horizontal plane (P) such that the storage container lifting device is arranged directly above the grid opening of the target storage column into which the selected target storage container is arranged,
  lifting the topmost storage container of the target storage column fully above the track system by use of the storage container lifting device.

If the topmost storage container is identified as a non-target storage container, the method further comprises the steps of:
  locating an available non-target storage column within the system onto or into which the non-target storage container may be arranged and
  arranging the storage container lifting device with the non-target storage container directly above the grid opening of the non-target storage column by operating the drive system to maneuver the vehicle in the horizontal plane (P) or operating the rotational drive system to rotate the rotational part relative to the base or a combination thereof and
  repeating the method steps involving the non-target storage container until the topmost storage container of the target storage column is the selected target storage container.

When the topmost storage container is identified as the target storage container, the method further includes transporting the topmost storage container, i.e. the target storage container, to a drop-off port within or adjacent to the track system.

In the following, numerous specific details are introduced by way of example only to provide a thorough understanding of embodiments of the claimed system, vehicle and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

Following drawings are appended to facilitate the understanding of the invention.

In the drawings, like reference numerals have been used to indicate like parts, elements or features unless otherwise explicitly stated or implicitly understood from the context.

DETAILED DESCRIPTION OF THE INVENTION

Figure 1:
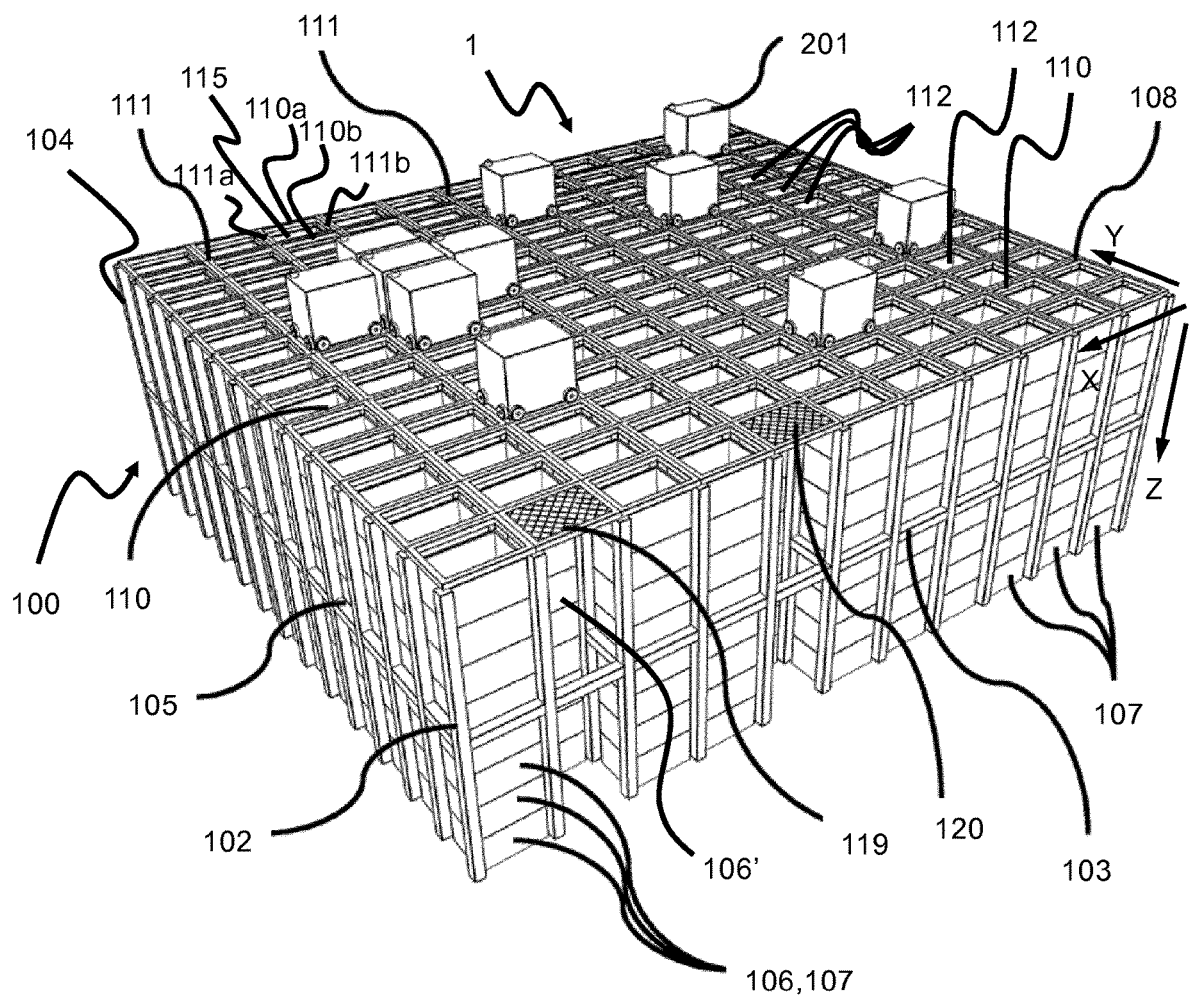
FIG. 1 is a perspective view of a grid of a prior art automated storage and retrieval system.
Figure 2:
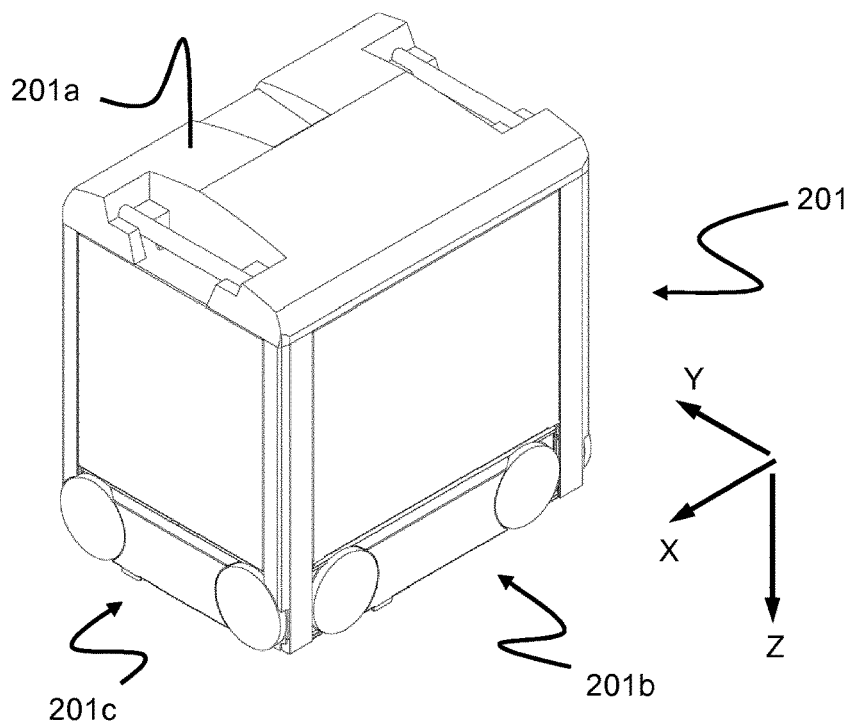
FIG. 2 is a perspective view of a prior art container handling vehicle having a centrally arranged cavity for containing storage containers therein.
Figure 3:
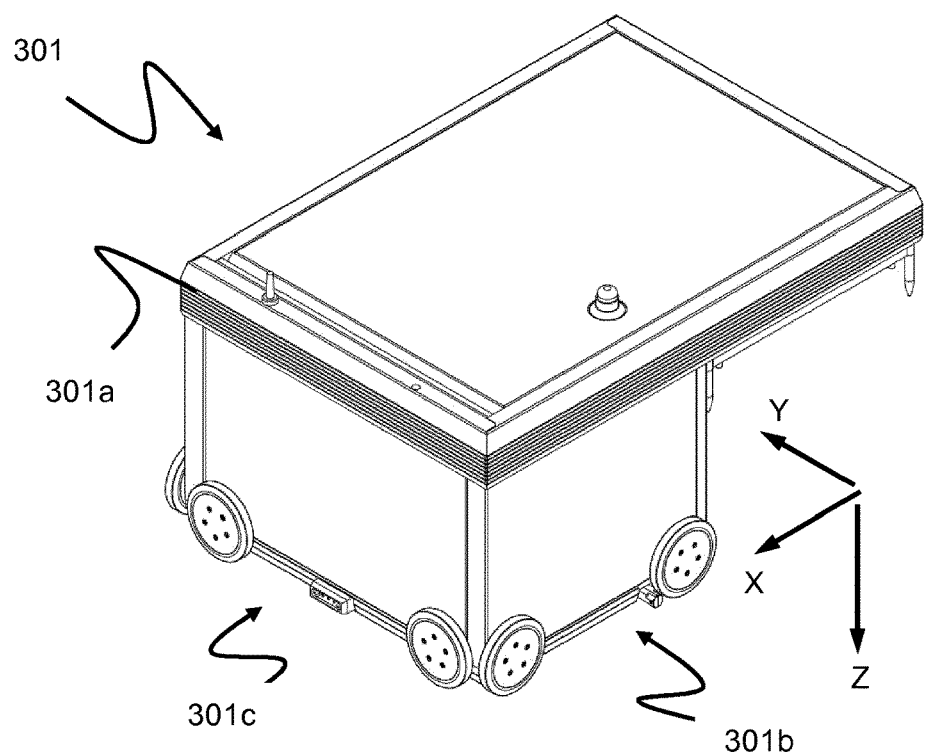
FIG. 3 is a perspective view of a prior art container handling vehicle having a cantilever for containing storage containers underneath.

In the following, embodiments of the invention will be discussed in more detail by way of example only and with reference to the appended drawings. It should be understood, however, that the drawings are not intended to limit the invention to the subject-matter depicted in the drawings.

If not otherwise stated, the framework 100 of the automated storage and retrieval system 1 is constructed in accordance with the prior art framework 100 described above in connection with FIGS. 1-5, i.e. a number of upright members 102 and a number of horizontal members 103 which are supported by the upright members 103, and further that the framework 100 comprise the track system 108 of parallel tracks 110,111 in X direction and Y direction arranged across the top of storage columns 105/grid columns 112. The horizontal area of a grid column 112, i.e. along the X and Y directions, may be defined by the distance between adjacent rails 110 and 111, respectively (see also FIGS. 4 and 5).

In FIG. 1 the grid 104 is shown with a height of eight cells. It is understood, however, that the grid 104 in principle can be of any size. In particular it is understood that grid 104 can be considerably wider and/or longer and/or deeper than disclosed in FIG. 1. For example, the grid 104 may have a horizontal extent of more than 700×700 grid cells and a depth of more than twelve grid cells.

One embodiment of a container handling vehicle 3 according to the invention will now be discussed in more detail with reference to FIGS. 6 to 9.

Each container handling vehicle 3 comprises a rotational part 30 rotationally coupled onto a base 31 via a swivel device 32. A drive system 18 is fixed to the base 3 enabling lateral/horizontal movement of the container handling vehicle 3, i.e. the movement of the vehicle 3 in the X and Y directions on the track system 108 of the storage grid 104.

Figure 4:
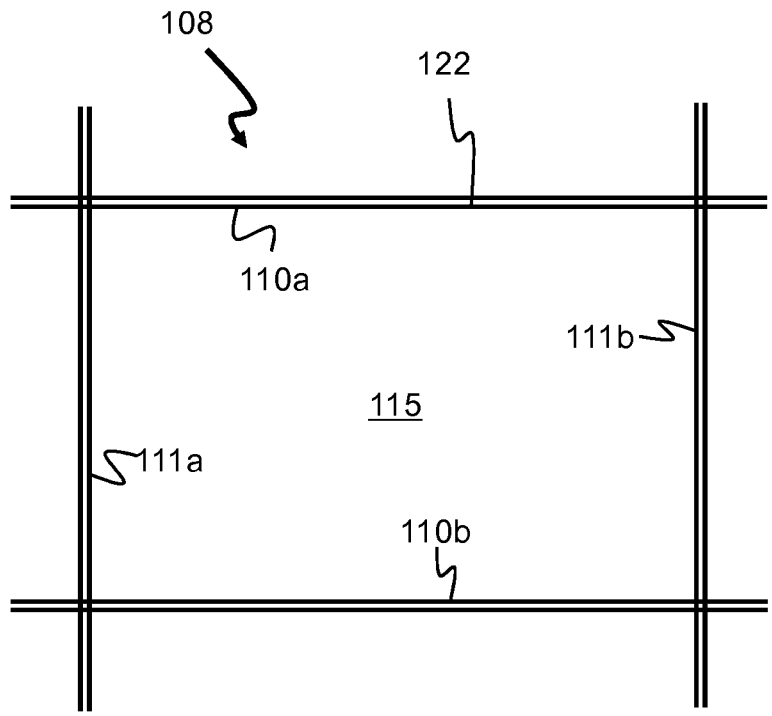
FIG. 4 is a top view of a prior art single rail grid.
Figure 5:
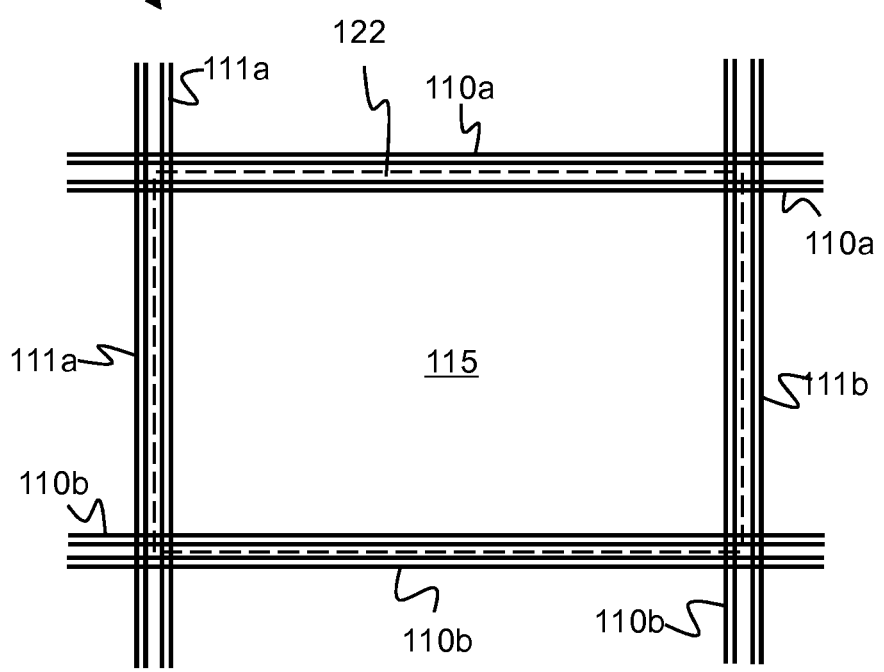
FIG. 5 is a top view of a prior art double rail grid.

The drive system 18 comprises a first set of wheels 19 arranged to engage with a pair of tracks 110a,110b of the first set of tracks 110, and a second set of wheels 20 arranged to engage with a pair of tracks 111a,111b of the second set of tracks 111 (see FIGS. 4 and 5). At least one of the set of wheels 19, 20 can be lifted and lowered so that the first set of wheels 19 and/or the second set of wheels 20 can be brought to engage with the respective set of tracks 110, 111 at any one time.

Each set of wheels 19, 20 comprises four wheels 19a, 19b, 19c, 19d; 20a, 20b, 20c, 20d arranged along the sides of the vehicle 3. Wheels 19a and 19b are arranged in a first vertical plane, and wheels 19c and 19d are arranged in a second vertical plane which is parallel to the first vertical plane and arranged at a distance from the first vertical plane which corresponds to the distance between rails 110a and 110b. Wheels 20a and 20b are arranged in a third vertical plane, which is orthogonal to the vertical planes in which wheels 19a-19d are arranged, and wheels 20c and 20d are arranged in a fourth vertical plane which is parallel to the third vertical plane and arranged at a distance from the third vertical plane which corresponds to the distance between rails 111a and 111b.

At least one of the wheels in each set 19, 20 may be motorized in order to propel the vehicle 3 along the track system 108. At least one motorized wheel in each set may include a hub motor, i.e. an electric motor that is coupled to, or incorporated into, the hub of a wheel and which drives the wheel directly. An example of a container handling vehicle with such a motor is disclosed in WO2016/120075A1, the contents of which are incorporated herein by reference. In an alternative example, at least one of the wheels 19a-d;20a-d is a passive wheel propelled by one or more motors situated within the base 31 and/or the rotational part 30 and/or the swivel device 32 of the vehicle 3. A drive system 18 involving a combination of hub motor(s) and external situated motor(s) may also be envisaged.

Each rotational part 30 comprises a bulk section 30b and a protruding section, hereinafter called cantilever 30a, extending horizontally in the X direction. In the particular embodiment shown in FIGS. 6-9 the cantilever 30a is formed by fixing cantilever beams 30c onto each vertical sides of a vehicle framework 30d at or near the vehicles 3 uppermost part. Both the vehicle framework 30d, constituting part of the rotational part 30, and the cantilever beams 30c are covered by two parallel vertical side covers 39 oriented along the direction of the cantilever beams 30c, a vertical front cover 37 oriented perpendicular to the direction of the cantilever beams 30b, a vertical back cover 38 oriented perpendicular to the direction of the cantilever beams 30c covering the rotational part 30 below the cantilever 30a and a horizontal top cover 36 covering the entire footprint of the vehicle 3, i.e. the horizontal extent of the vehicle 3 seen from above.

The bulk section 30b may contain bulky components such as a vehicle battery 40, a control panel 35, and any motors 15a operating the vehicle 3.

The vehicle battery 40 may be fixed into the bulk section 30b by fastening means. Further, the vehicle 3 may include a charging socket 41 coupled to the battery 40 in order to allow battery recharging at a dedicated charging station within the automated storage and retrieval system 1. Alternatively, or in addition, the vehicle 3 may be equipped with a replaceable battery 40, for example a replaceable battery having a corresponding battery slot 40a within the vehicle 3, for example within the bulk section 30b, and a battery opening 40b having a size allowing the replaceable battery 40 to be guided through. The battery opening 40b is for example in the front cover 37. The corresponding charging stations and the battery exchange mechanisms may be the same as the charging stations and exchange mechanisms as disclosed in the international patent publication WO 2015/104263, which contents are incorporated herein by reference. Particular reference is made to the disclosure of the battery exchange mechanism in WO 2015/104263 referring to FIGS. 7-9.

Since the bulk section 30b of the rotational part 30 does not need to allocate any space for a storage container 106, the design of the vehicle 3 allows larger batteries to be mounted/coupled in/to the vehicle 3.

The rotation part 30 comprises a storage container lifting device 16 arranged within and/or below the cantilever 30a for vertical transportation of a storage container 106, e.g. lifting a storage container 106 from a storage column 105 and bringing it to a position in a container receiving space 33 between the underlying rail system 108 and the cantilever 30a, and also for lowering a storage container 106 from the container receiving space 33 into a storage column 105. The lifting device 16 comprises one or more lifting shafts 15 connected to one or more lifting motors 15a ensuring rotational power to the lifting shafts 15, one or more lifting belts 14 rotationally attached to the lifting shaft 15 and a lifting plate 13 attached at its upper face to the end of the lifting belts 14 not attached to the respective lifting shaft 15. The lifting shafts 15, the lifting motors 15a and the lifting belts 14 are configured to allow winding on to/out from the lifting shaft 15 during operation by the lifting motors 15a, thereby allowing lifting and lowering of the lifting plate 13, i.e. adjusting the lifting plate 13 in a third direction Z which is orthogonal to the first direction X and the second direction Y. The lifting device 16 further comprises one or more engagement devices or gripping devices 12 and one or more guiding pins 17 arranged at the lower face of the lifting plate 13. The engagement devices 12 are configured to grip or engage the storage container 106 for lifting/lowering, and the guiding pins 17 are configured to ensure sufficiently accurate positioning of the lifting device 16 in respect of the storage container 106 during lifting/lowering operations.

In the embodiment shown in FIGS. 6-9 the lifting device 16 comprises two lifting shafts 15 arranged within the cantilever 30a in the direction of the cantilever beams 30b at or near each vertical sides of the vehicle, two lifting belts 14 arranged at or near the ends of each lifting shafts 15 for allowing winding thereon and where the ends of each belt 14 distal to the lifting shafts 15 is attached at or near the four corners on the upper face of the lifting plate 13. Each lifting shaft 15 is operated by a dedicated lifting motor 15a arranged within the rotational part 30 outside the cantilever 30a. The lifting shafts 15 may also be arranged immediately above and/or beneath the cantilever 30a.

Conventionally, and also for the purpose of this application, Z=1 identifies the uppermost layer of the storage grid, i.e. the layer immediately below the track system 10, Z=2 the second layer below the track system 10, Z=3 the third layer etc. The container handling vehicles 3 can be said to travel in layer Z=0. Consequently, each storage column can be identified by its X and Y coordinates, and each storage position in the storage grid can be identified by its X, Y and Z coordinates.

When a storage container 106 stored in the storage grid 104 is to be accessed, one of the container handling vehicles 3 is instructed to retrieve the target storage container 106 from its position in the storage grid 104 and to transport the target storage container 106 to an access station (not shown) where it can be access from outside of the storage grid 104 or transferred out of the storage grid 104. This operation involves moving the container handling vehicle 3 to a position where the cantilever 30a is positioned directly above a grid opening 115 of a storage column 105 in which the target storage container 106 is positioned and retrieving the storage container 106 from the storage column 105 using the container handling vehicle's lifting device 16. This step involves using the lifting device 16 to lift the storage container 106 from the storage column 105 through the grid opening 115 and into the container receiving space 33 of the vehicle 3.

If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 3 that is subsequently used for transporting the target storage container 106 to the access station, or with one or a plurality of other cooperating container handling vehicles. Alternatively, or in addition, the automated storage and retrieval system 1 may have container handling vehicles specifically dedicated to the task of temporarily removing storage containers from a storage column. Once the target storage container 106 has been removed from the storage column 105, the temporarily removed storage containers can be repositioned into the original storage column 105. However, the removed storage containers may alternatively be relocated to other storage columns.

Once the target storage container 106 has been brought into the container receiving space 33 of the container handling vehicle 3 immediately below or partly into the cantilever 30a, the vehicle 3 transports the storage container 106 to the access station where it is unloaded. The access station may typically comprise a grid location at the periphery of the storage grid 104 where the storage container 106 can be accessed manually or transported further using a suitable conveyor system.

When a storage container 106 is to be stored in the storage grid 104, one of the container handling vehicles 3 is instructed to pick up the storage container 106 from a pick-up station (not shown), which may also double as an access station, and transport it to a grid opening 115 above the storage column 105 where it is to be stored. After any storage containers positioned at or above the target position within the storage column stack 107 have been removed, the container handling vehicle 3 positions the storage container 106 at the desired position. The removed storage containers may then be lowered back into the storage column 105, or relocated to other storage columns within the storage grid 104.

The cantilever 30a and/or the suspended lifting device 16 may also hold one more sensors 21 and/or one or more cameras 21, preferably down-looking sensors 21 and/or cameras 21. The sensors may be used to establish the position of the vehicle on the track system 108, e.g. the alignment of the vehicle vis-à-vis a grid opening 115 or to establish the position of the vehicle 3 vis-à-vis other vehicles on the track system 108, e.g. when operating the vehicles as a train of vehicles, an operation considered beneficial for a cantilever type vehicle with a rotational part since a train of vehicles may be easily formed with a uniform direction of the cantilevers by simple rotations.

A camera opens up additional possibilities such as visual inspection of the contents within a storage container, which images may be sent to the user/customer via the control system. Hence, when searching for one or more specific items, the user and/or customer may have access to an image of the position, orientation and size within a storage container 106. The sensors and/or cameras may be arranged on the lower face of the cantilever 30a such that free sight to the underlying track system is ensured, at least part of the operational time. Further, the cameras may alternatively, or in addition, be arranged on the storage container lifting device 16 enabling free sight into at least the topmost storage container 106 within a storage column 105. The ability to rotate the rotational part 30 further increases the usability of said sensors or cameras since it enables sweeping over larger areas within the system 1.

Of course, one or more cameras and/or sensors may be mounted elsewhere on the vehicle 3, for example in order to gain information of zones along and/or above the framework 100. For example, a camera may be mounted on top of the vehicle 3 and/or on an antenna of the vehicle 3.

Figure 15:
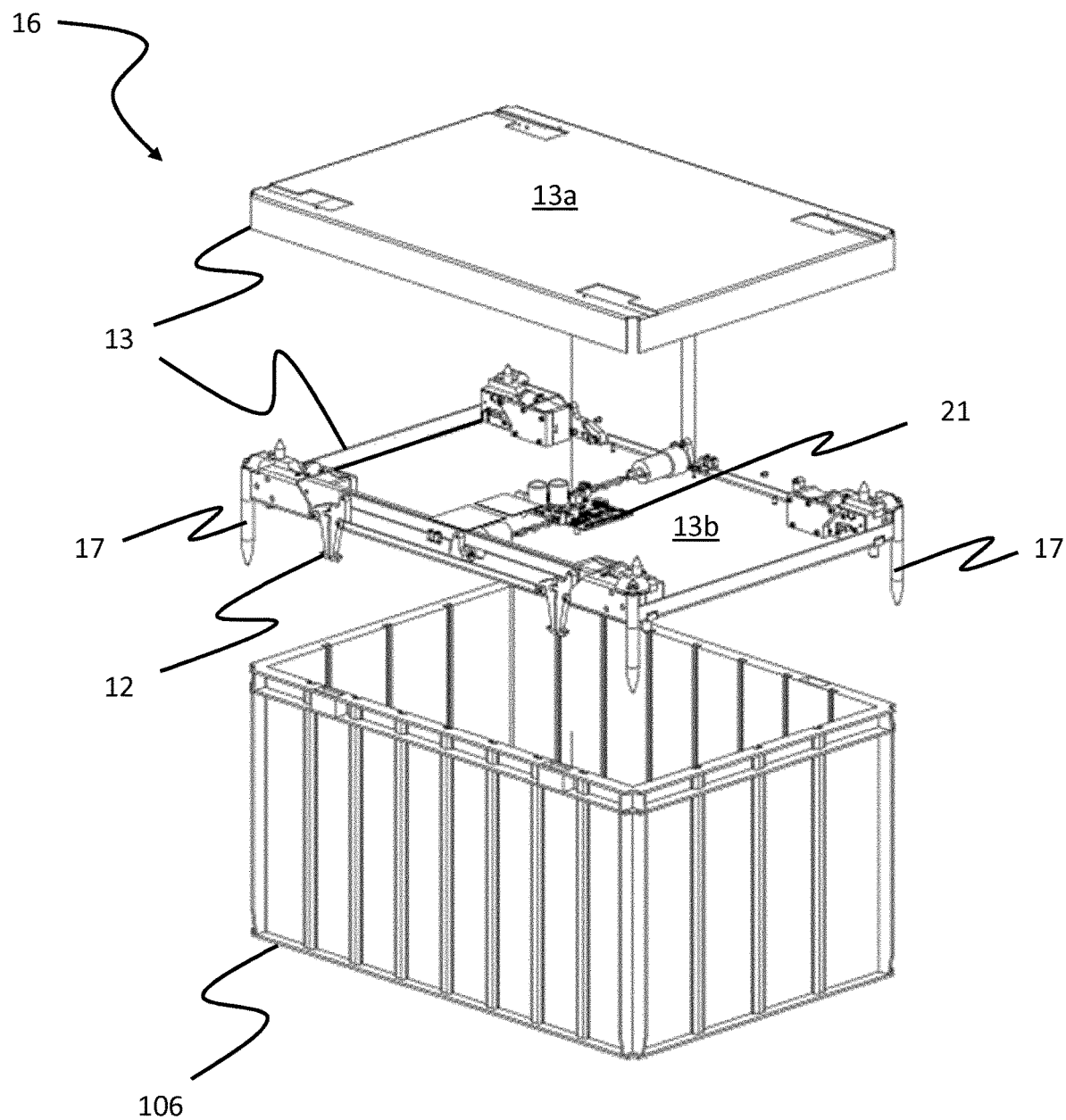
FIG. 15 is an exploded perspective view of a lifting device capable of lifting a single storage containers in one lifting operation.

FIG. 15 shows an example of a lifting device 16 comprising a lifting plate 13, a plurality of gripping devices 12 for gripping/engaging with a storage container 106 and a plurality of guiding pins 17 for aligning the lifting device 16 with the storage container 106. The lifting plate 13 further comprises a top cover 13*a*, a base cover 13*b* and one or more cameras 21 installed on the lifting plate 13, preferably within the base cover 13*b*. The one or more cameras 12 are configured to record and register images of products arranged below the lifting device 16, i.e. into the framework structure 100 and underlying storage containers 106.

For monitoring and controlling the automated storage and retrieval system 1 so that a desired storage container 106 can be delivered to the desired location at the desired time without the container handling vehicles 3 colliding with each other, the automated storage and retrieval system comprises a control system (not shown), which typically is computerized and comprises a database for monitoring and controlling e.g. the location of the respective storage containers 106 within the storage grid 104, the content of each storage container 106 and the movement of the container handling vehicles 3.

The container handling vehicles 3 typically communicates with the control system from a control panel 35, typically arranged on top of the vehicle 30 as shown in FIGS. 6-9, via wireless communication means, e.g. via a WLAN operating under an IEEE 802.11 (WiFi) standard and/or utilizing a mobile telecommunication technology such as 4G or higher.

Each container handling vehicle 3 comprises a battery 40 which provides power to onboard equipment, including the lifting motor 15*a*, the drive system 18 for the first and second wheel arrangements 19, 20 and onboard control and communications systems.

The wheels 19*a*-19*d*, 20*a*-20*d* are arranged around the periphery of the base 31 of the vehicle 3, below the rotational part 30. The vertical side walls 37-39 (see FIG. 9) covering the sides of the rotational part 30 are in the first embodiment co-planar to the vertical planes in which the wheels 19*a*-19*d*; 20*a*-20*d* are arranged. Consequently, the bulk section 30*b*, that is, the rotational part 30 excluding the cantilever 30*a*, has a generally cuboid shape.

Figure 6:
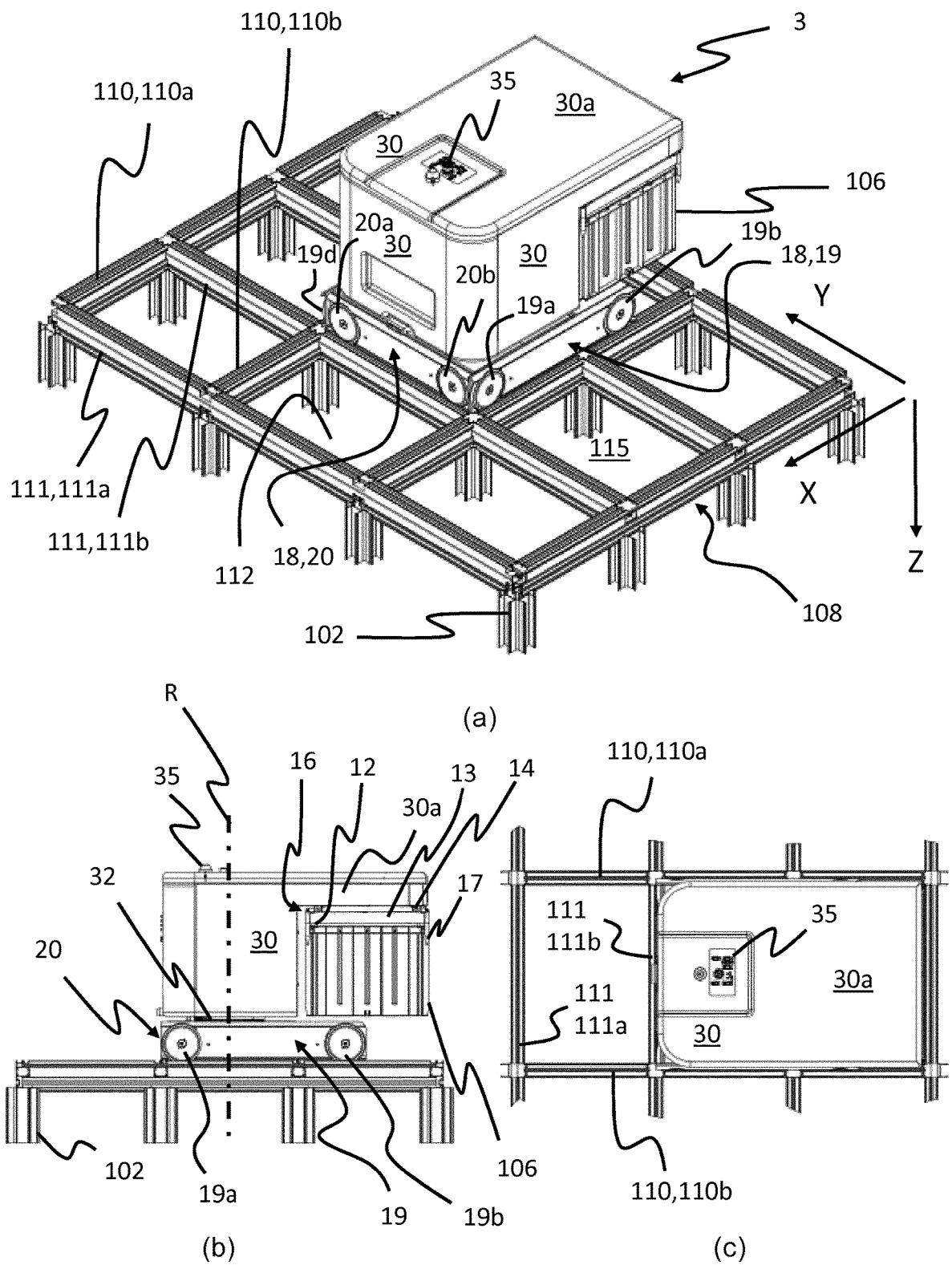
FIGS. 6(a)-(c) shows in a perspective view, a side view and a top view, respectively, a container handling vehicle of a first embodiment of the invention operating on double rail grid cells of an automated storage and retrieval system.
Figure 7:
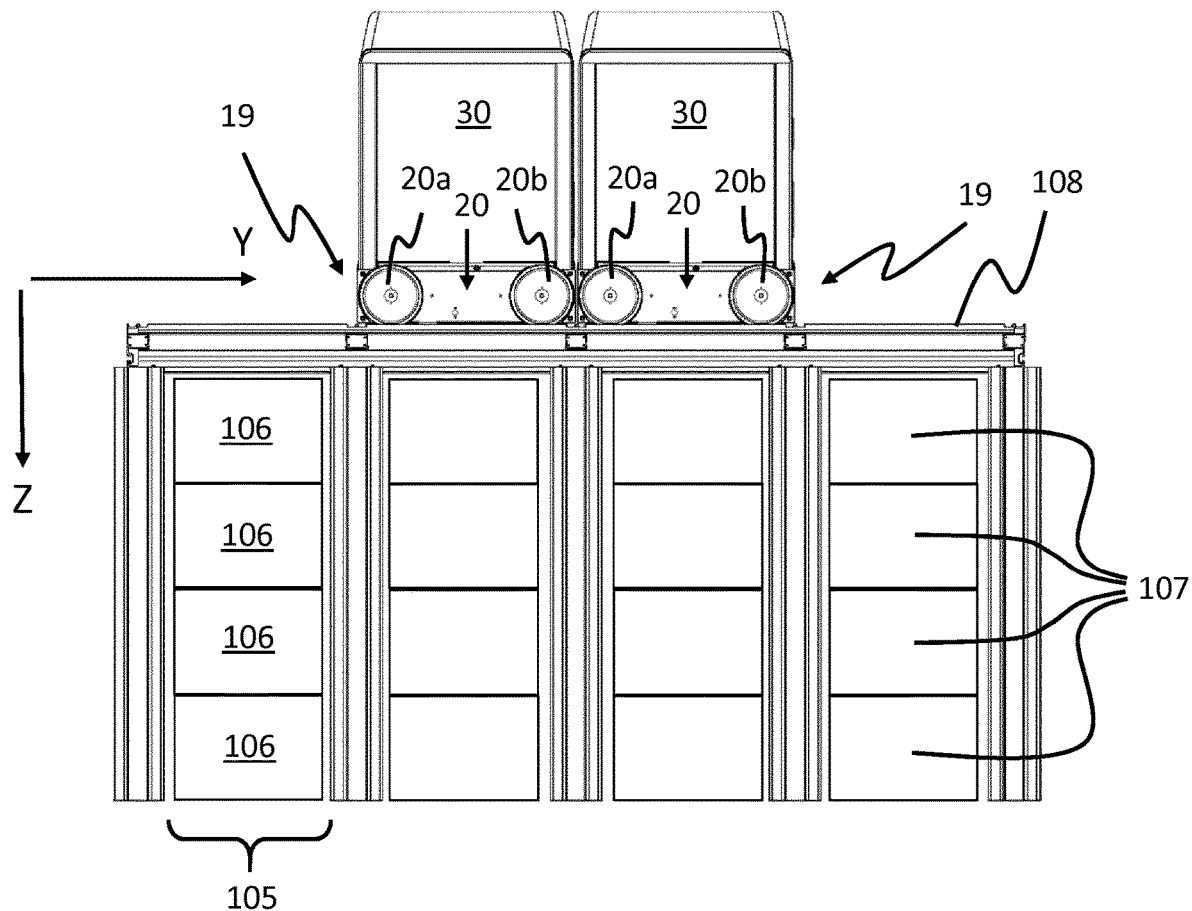
FIG. 7 is a side view of the storage container filled automated storage and retrieval system seen along the X direction, where two container handling devices as shown in FIG. 6 are arranged side by side on double rail grid cells.
Figure 8:
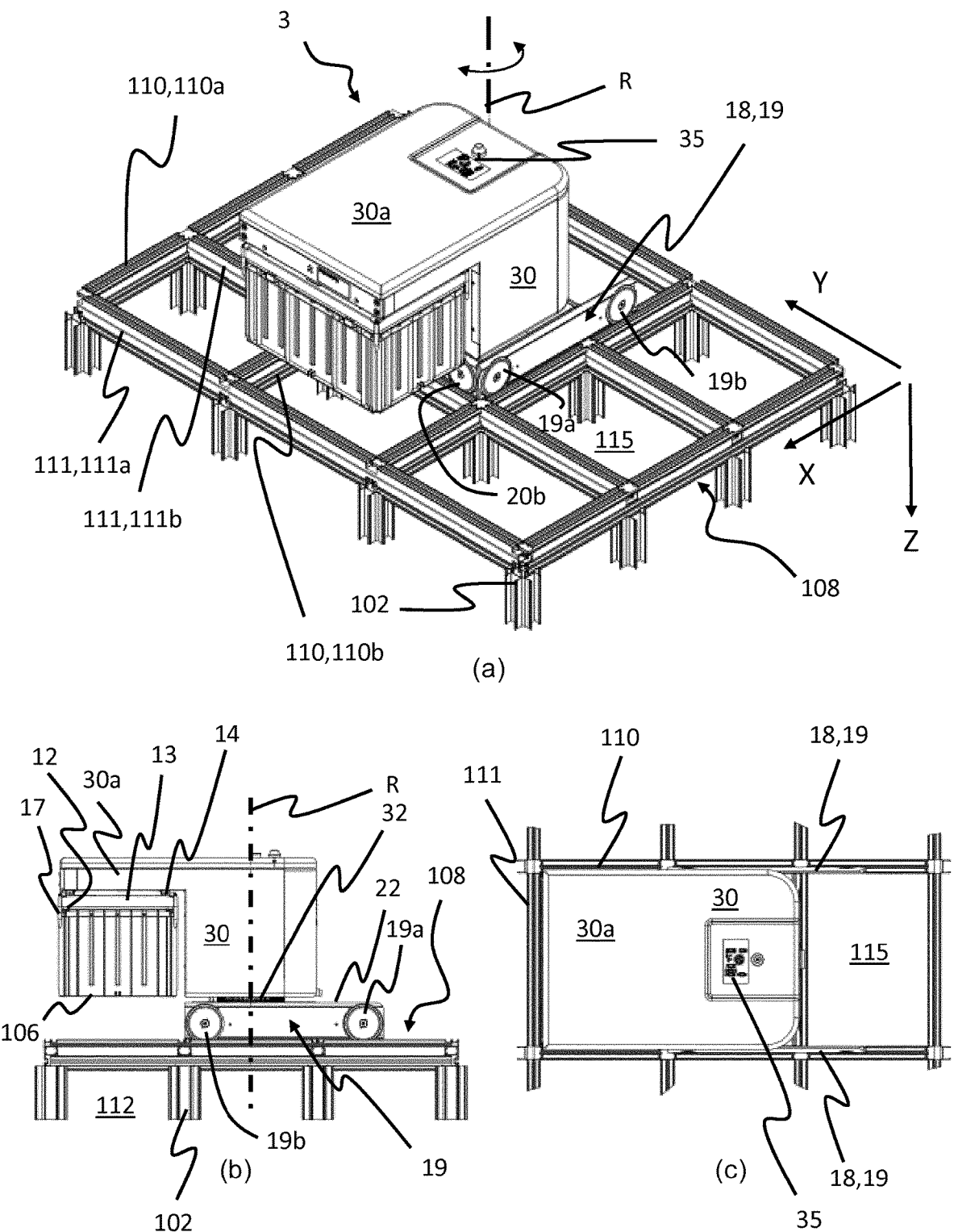
FIGS. 8(a)-(c) shows the container handling vehicle of FIGS. 6 and 7 in a perspective view, a side view and a top view, respectively, where the rotational part of the container handling vehicle has been rotated 180°.

As is most apparent in FIGS. 6(*b*) and (*c*), FIG. 7 and FIGS. 8(*b*) and (*c*), the vehicle 3 of the first embodiment has a footprint in the X direction, i.e. the horizontal extent in the X direction seen from above, covering two grid openings 115 and a footprint in the Y direction, i.e. the horizontal extent in the Y direction seen from above, covering a single grid opening.

The consequence of the cantilever design described above is that, when the vehicle 3 is positioned above a grid opening 115, e.g. to access a container 106 in the storage column 105 located vertically below the grid opening 115, the cantilever 30*a* will extend over a neighboring grid opening 115. Normally this would prevent a second vehicle from travelling over this neighboring grid cell, i.e. the grid cell into which the protruding section 27 of the first vehicle 3 extends, thereby potentially reducing the overall capacity of the automated storage and retrieval system 1.

However, with the novel configuration of vehicle 3 other vehicles may be allowed to pass over a neighboring grid opening by rotating the rotation part 30, and thereby the cantilever 30*a*, 180° or more in respect of the base 31, prior to, and/or during, the passing of the other vehicle(s). Proper timing of the rotation may be set by the control system. This embodiment is not shown in the accompanied figures. However, it may be implemented by simply removing a wheel arrangement protrusion 22 further explained below, see FIGS. 6, 8, 9 and 11, and reconfiguring the affected wheels 19*b*, 19*c* in order to ensure a footprint in both X and Y direction below the cantilever 30*a* laying within the size of a grid opening 115.

Figure 9:
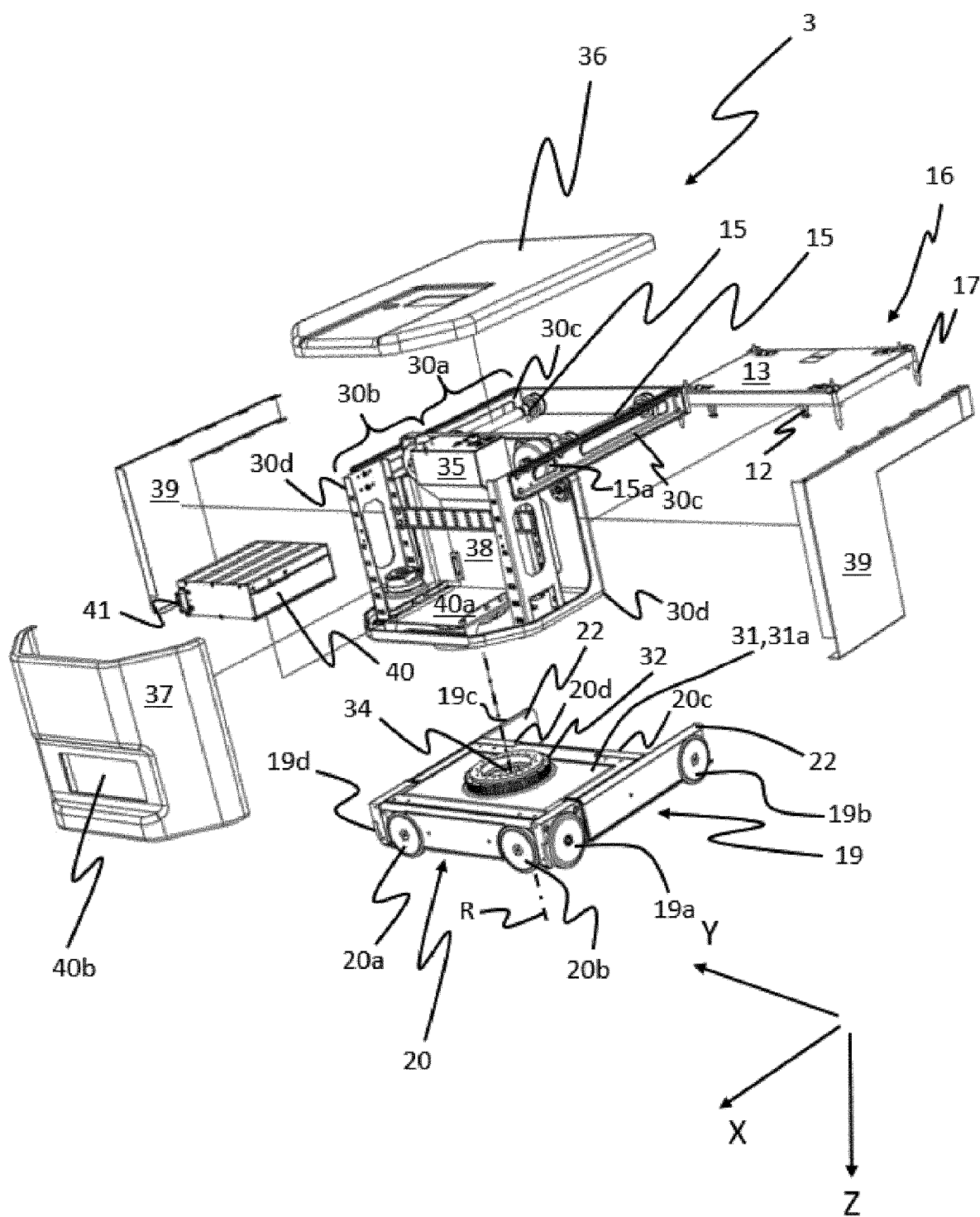
FIG. 9 is an exploded perspective view of the container handling vehicle of FIG. 6-8.

A rotation of the rotating part 30 relative to the base 31 is illustrated in FIGS. 6 and 8 showing a vehicle 3 initially in a position where the cantilever 30*a* is directed in a negative X-direction (FIG. 6(*a*)) and after rotation of the rotational part 30 180°, resulting in a direction of the cantilever 30*a* along a positive X direction (FIG. 8(*a*)). The rotation of the rotating part 30 is achieved by operating the swivel device 32 by a rotor activating motor 34, preferably arranged within the base 31 (FIG. 9).

To achieve further stability of the vehicle 3, the first wheel arrangement 19 directed in the X direction has on each side of the vehicle 3—a wheel arrangement protrusion 22 extending the total length of the first wheel arrangement 19, and in particular the distance between each wheel pairs 19*a*, 19*b* and 19*c*, 19*d*, beyond the footprint of the bulk section 30*b*.

For both configurations, i.e. both without and with the wheel arrangement protrusion 22, the possibility of rotating the cantilever 30*a* has significant advantages over the prior art cantilever design disclosed in NO317366. For example, due to the possibility to rotate the rotating part 30 180° or more, each vehicle 3 may transport storage columns 106 from/to port columns 119, 120 and/or conveyor belts situated at two facing vertical sides at the outer boundaries of the storage grid 104. If the port columns and/or the conveyor belts are situated within the storage grid 104 as illustrated in FIG. 1, each vehicle 3 may transport storage containers 106 from/to ports/conveyor belts situated at all vertical sides at the outer boundaries of the storage grid 104, i.e. vertical sides oriented both in X direction and Y direction. Another advantage in respect of the prior art cantilever design is that all novel vehicles 3 operating on the system 1 may access all storage columns 105, also the storage columns 105 located at the outer boundaries of the storage grid 104.

Figure 10:
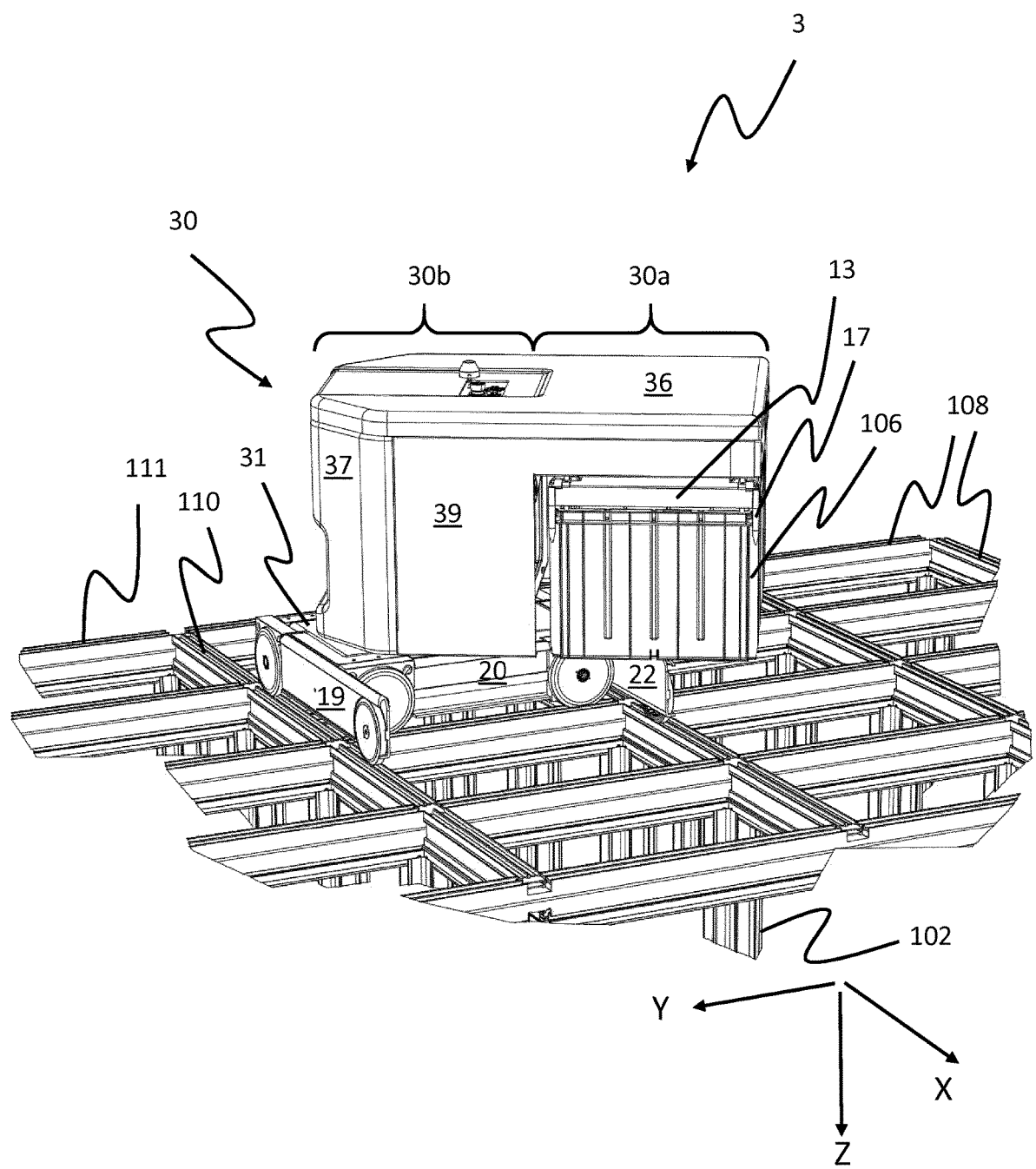
FIG. 10 is a perspective view of the container handling vehicle of FIG. 6-9, wherein the rotational part of the container vehicle has been rotated 45°.

FIG. 10 shows the container handling vehicle 3 where the rotational part 30 has been rotated approximately 45° in the horizontal plane (P) relative to the X direction.

Figure 11:
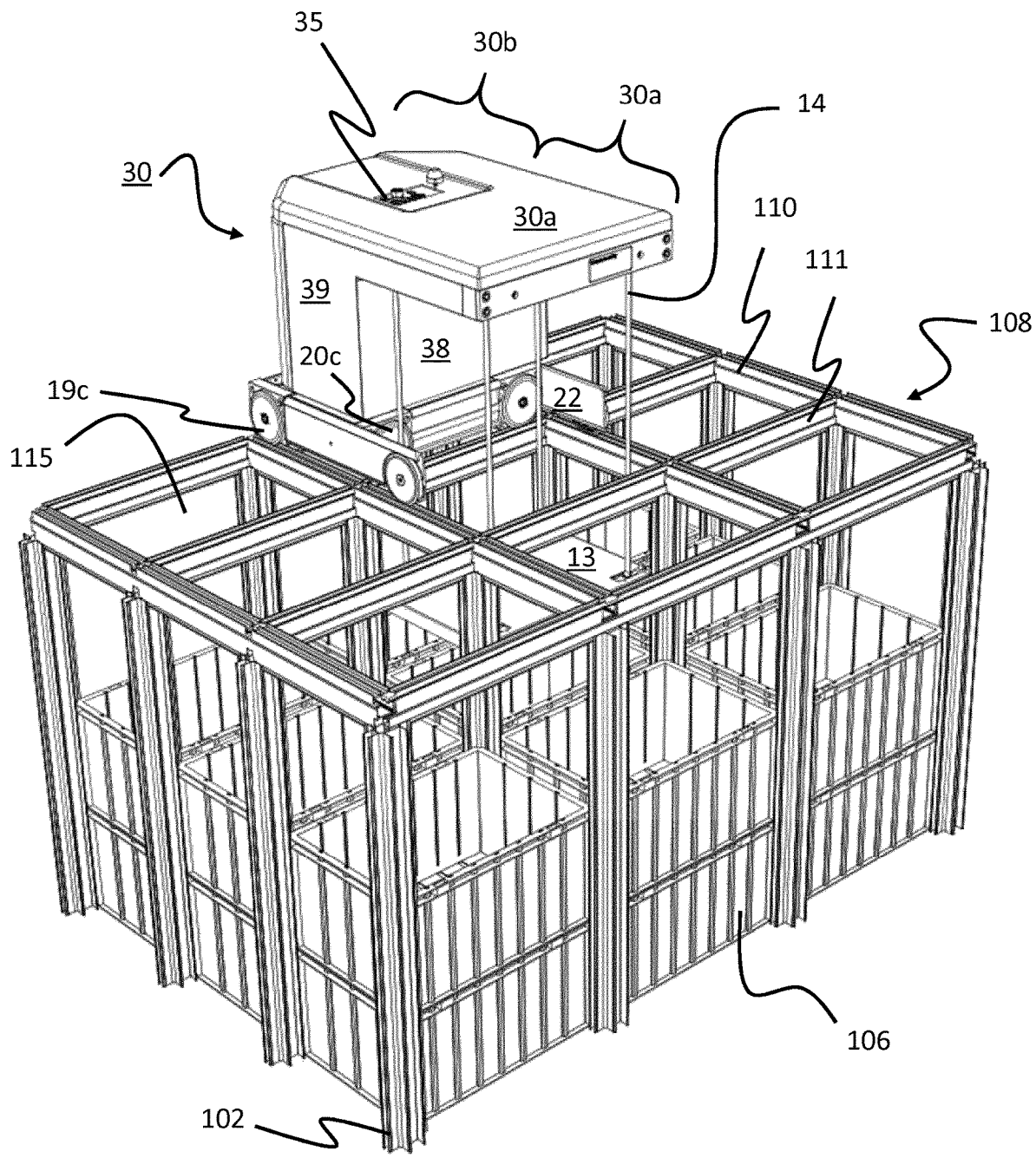
FIG. 11 is a perspective view of the container handling vehicle of FIG. 6-10, wherein a lifting device of the container handling vehicle has been lowered into a storage column of an automated storage and retrieval system

Further, FIG. 11 shows the container handling vehicle 3 having the cantilever 30*b* directed along the positive X-direction and where the lifting device 16 has been lowered into the underlying framework 100, towards the topmost storage container 106 of a stack 107.

Figure 12:
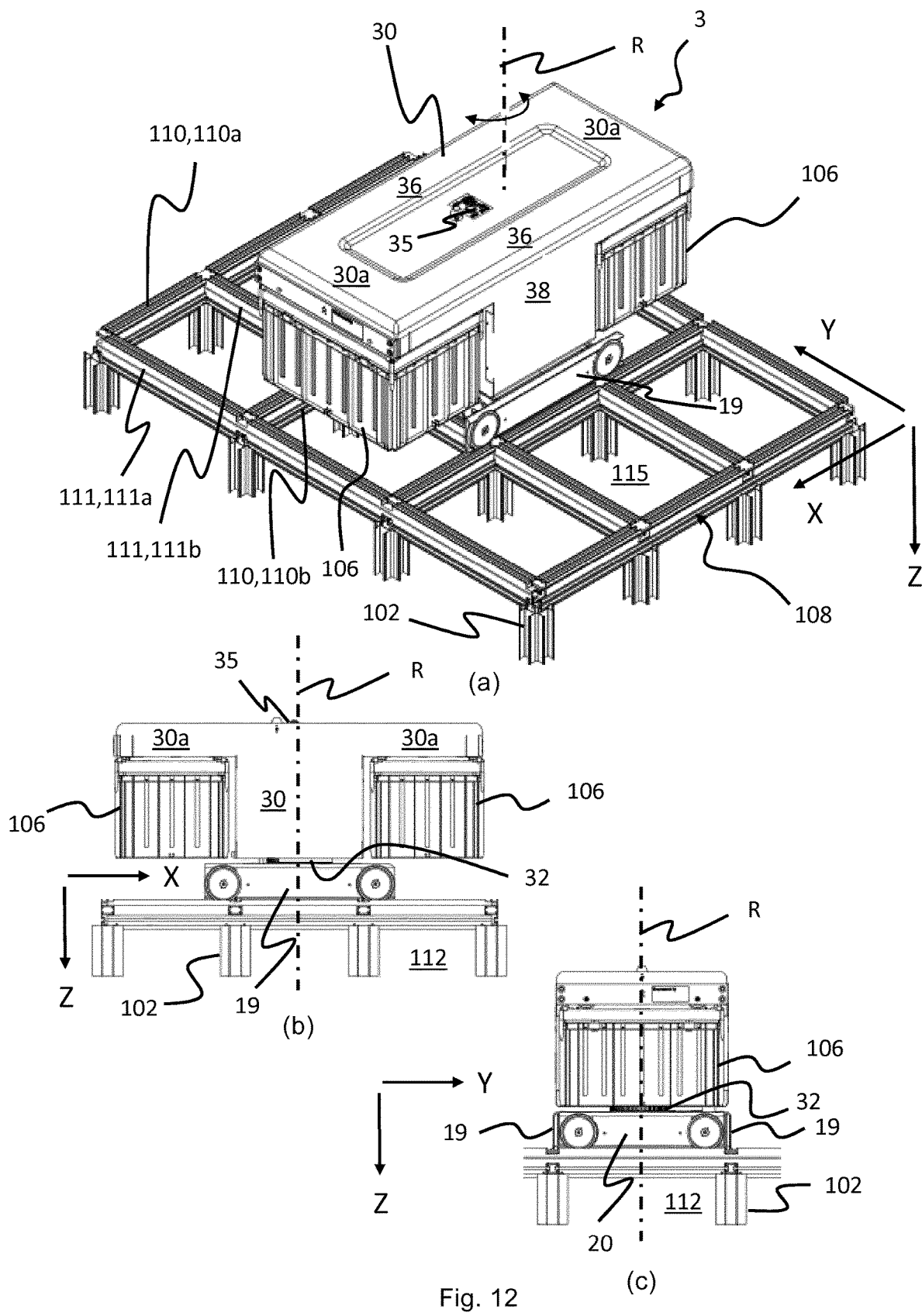
FIGS. 12(a)-(c) show in a perspective view, a side view and an end view, respectively, a container handling vehicle of a second embodiment of the invention operating on double rail grid cells of an automated storage and retrieval system.

FIG. 12 shows a second embodiment of the invention where the rotational part 30 of the vehicle 3 comprises a bulk section 30*b* and two protruding sections 30*a* extending horizontally from the uppermost part of the bulk section 30*b*. With the exception of having protruding sections 30*a* in both positive and negative X directions, the configuration of the vehicle 3 in the second embodiment is identical or near identical to the first embodiment, that is, with a storage container lifting device 16 arranged beneath the lower face of each protruding sections 30*a*, where each lifting device 16 comprises one or more lifting shafts 15 connected to one or more lifting motors 15*a*, one or more lifting belts 14 and a lifting plate 13, and where the lifting plate 13 further comprises one or more engagement devices 12 and one or more guiding pins 17. As is most apparent in FIGS. 12(*b*) and (*c*), the vehicle 3 of the second embodiment has a footprint in the X direction covering three grid openings 15 and a footprint in the Y direction covering a single grid opening. As for the first embodiment, the vehicle battery 40 may either be fixed within the bulk section 30b or replaceable as exemplified in the patent publication WO 2015/104263 incorporated herein by reference.

In addition to the advantage concerning arrangement of ports and access to storage cells at storage grid boundaries, the vehicle 3 of the second embodiment also have the advantage of allowing simultaneous or sequential handling of a plurality of storage containers 106, for example lowering a storage container at one side of the vehicle 3 while raising another storage container at the opposite side of the vehicle 3. Or lowering/raising two storage containers simultaneously. Or lowering/raising two storage containers from/to the same storage column by rotating the rotational part 180°.

Figure 13:
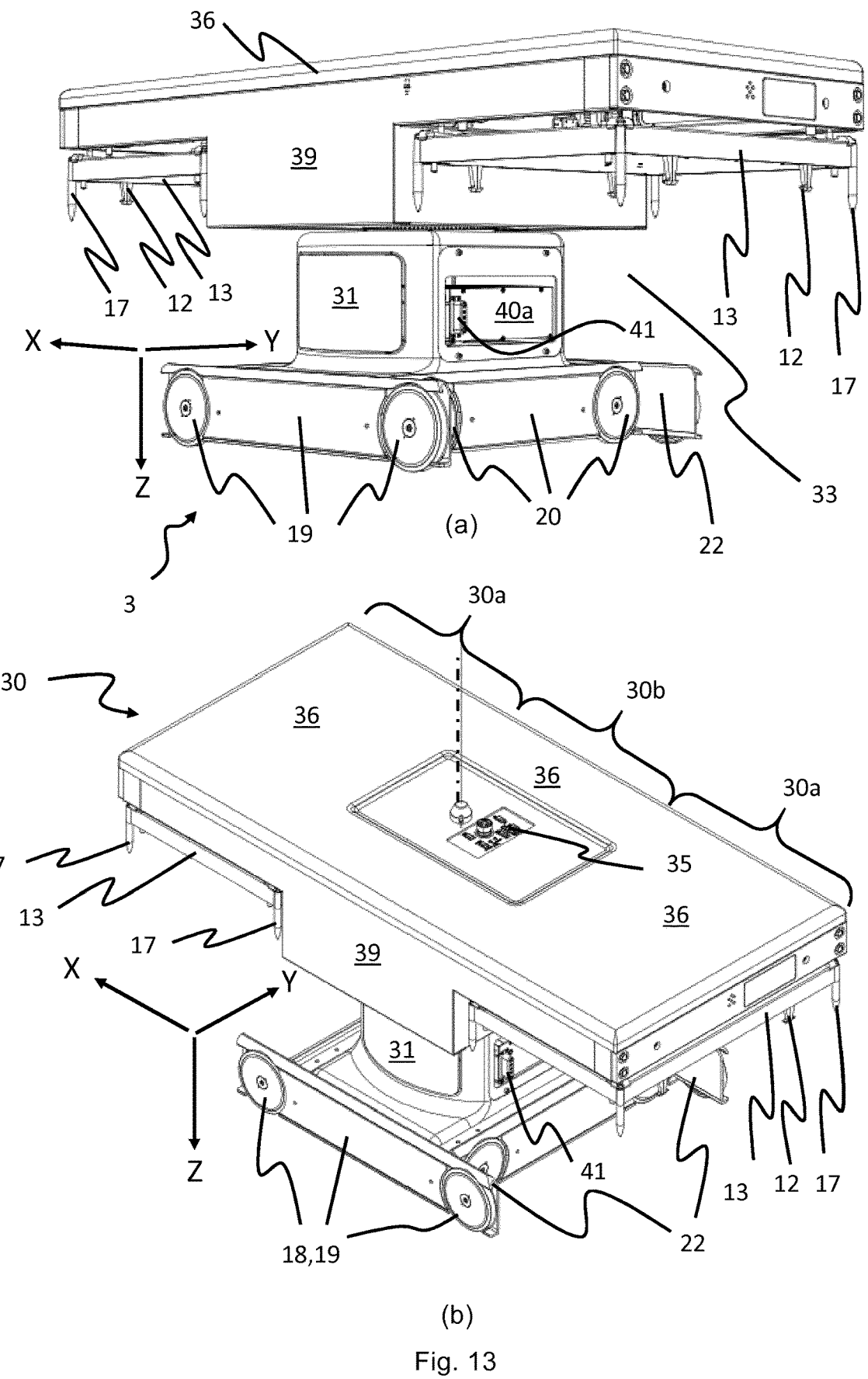
FIGS. 13(a)-(b) are perspective views from two different angles of a container handling vehicle of a third embodiment of the invention.
Figure 14:
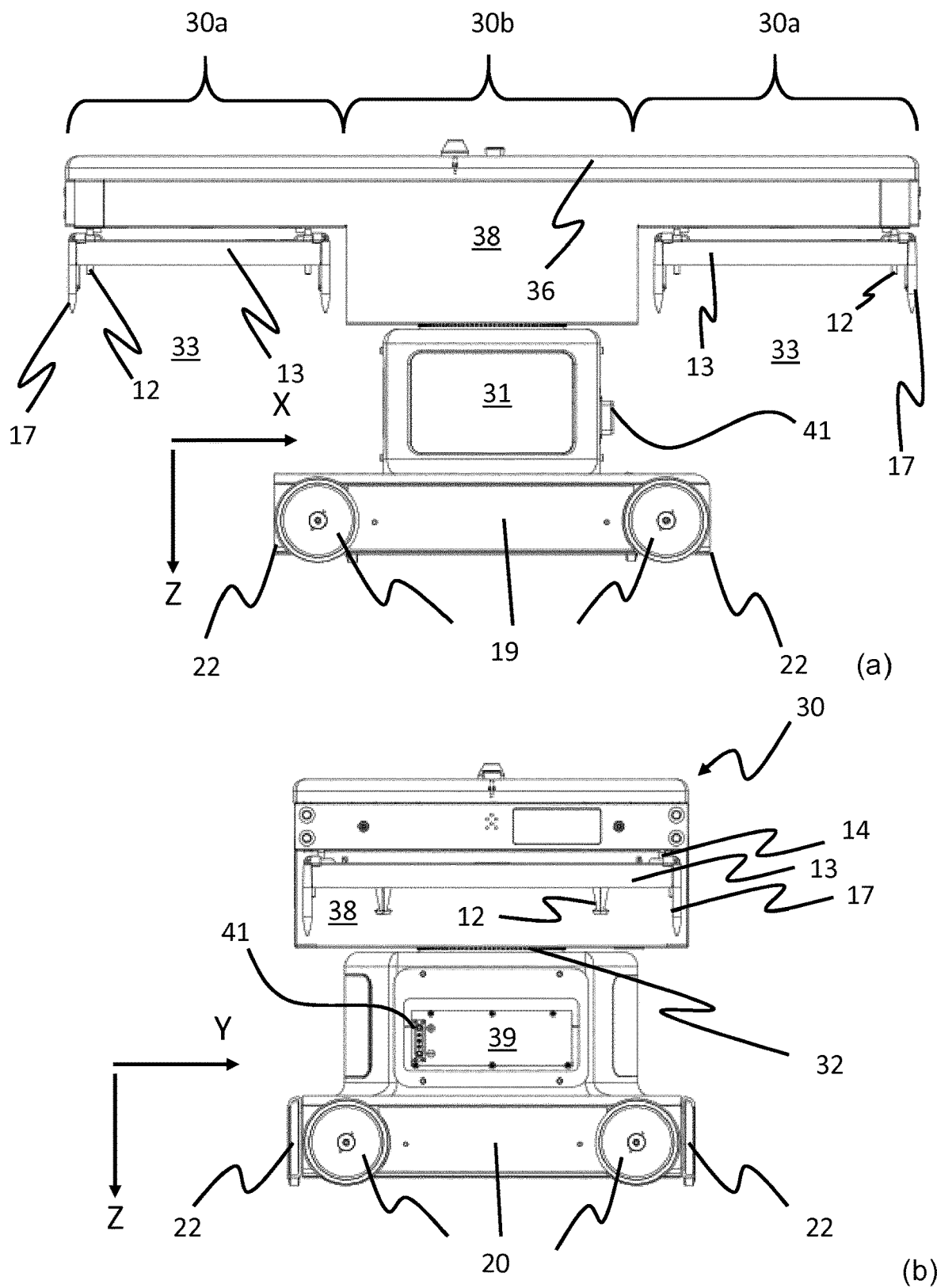
FIGS. 14(a)-(b) are side views of the container handling vehicle in FIG. 12 seen along the Y direction and the X direction, respectively.

In both the first and second embodiment of the invention, the base 31 of the vehicle 3 is arranged fully within both the vertical and horizontal extent of the wheel arrangement 18. Further, the vehicle battery 40 is arranged within, onto or under the bulk section 30b of the rotational part 30. FIGS. 13-14 shows a third embodiment of the invention where the base 31 extends above, or is arranged above, the wheel arrangement 18. In this particular embodiment, at least some bulky components such as the vehicle battery 40 may advantageously be arranged onto or within the base 31 instead of the rotational part 30. In FIGS. 13-14, a battery receiving structure 40a is shown on the vertical wall 37 of the vehicle's base 31 facing the negative X direction. When the vehicle battery 40 is to be replaced, the vehicle 3 moves to a dedicated charging station (not shown) and perform the battery exchange similar or equal to the battery exchange disclosed in WO 2015/104263 incorporated herein by reference. In order to avoid or reduce interference with the cantilever 30a, the rotational part 30 may optionally rotate 90° relative to the base 31 prior to battery exchange with the charging station. Alternatively, the vehicle battery 40 may be mounted on the side walls.

Figure 16:
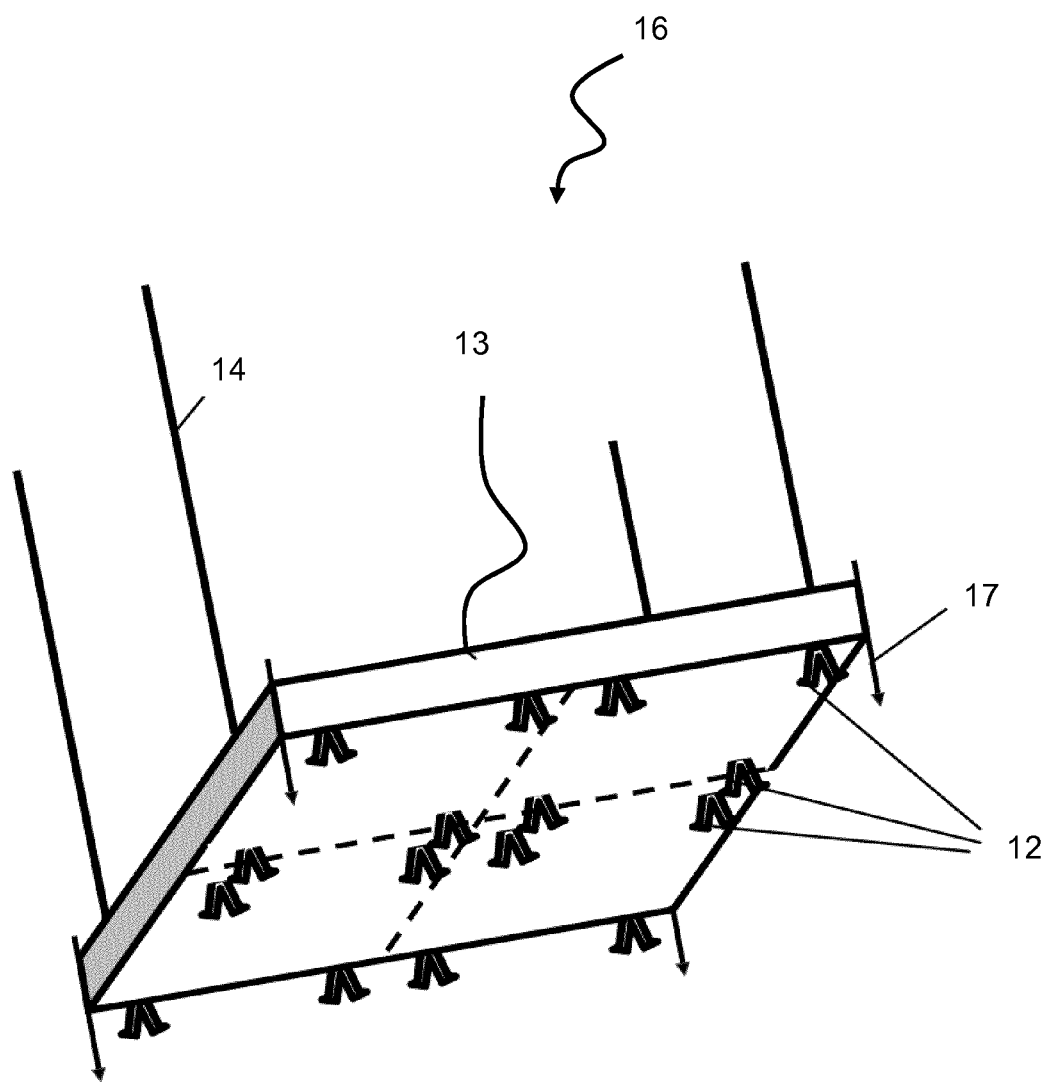
FIG. 16 is a perspective view of a lifting device capable of lifting a plurality of storage containers in one lifting operation.

As schematically illustrated in FIG. 16, a single storage container lifting device 16 may also handle a plurality of storage containers 106 may equipping the lifting device 16 with a number of engagement devices 12 such as claws or clips that corresponds to the total number of upper horizontal corner of the storage containers 106 to be picked by the vehicle 3 in the same picking operation. FIG. 16 shows a specific example of 4×4 clips allowing up to four storage containers 106 to be picked in the same operation, assuming a 2×2 storage container configuration within a storage column. Each, some or all the clips in each lifting unit 6 may be remotely operated by a control system. As explained above, each corner of the lower face of the lifting plate 13 is preferably arranged with one or more guiding pins 17 to ensure adequate guiding of the engagement devices 12 on or into corresponding engagement device receiving structures.

In the preceding description, various aspects of an automated storage and retrieval system, a vehicle and a method according to the invention have been described with reference to the illustrative embodiment. However, this description is not intended to be construed in a limiting sense. Various modifications and variations of the illustrative embodiment, as well as other embodiments of the system, the vehicle and the method which are apparent to persons skilled in the art, are deemed to lie within the scope of the present invention as defined by the following claims. As an example, an automated storage and retrieval system may be envisaged where the above mentioned inventive cantilever vehicles operates in conjunction with prior art vehicles such as the central cavity vehicles disclosed in WO2014/090684A1, the single cell vehicles disclosed in WO2015/193278A1 and/or the non-rotational cantilever vehicles disclosed in NO317366, and where the cantilever of each inventive cantilever vehicles is high enough above the rail system to allow one or more of the prior art vehicles to drive under during operation.

REFERENCE NUMERALS

1 Automated storage and retrieval system
3 Vehicle, first embodiment
12 Gripping device/engagement device/claw/clip
13 Lifting plate
13a Top cover of lifting plate 13
13b Base cover of lifting plate 13
14 Lifting belt
15 Lifting shaft
15a Lifting motor
16 Storage container lifting device
17 Guiding pins
18 Drive system/wheel arrangement of vehicle 3
19 First wheel arrangement/first set of wheels/first drive system, first direction X
19a First wheel of first wheel arrangement 19
19b Second wheel of first wheel arrangement 19
19c Third wheel of first wheel arrangement 19
19d Fourth wheel of first wheel arrangement 19
20 Second wheel arrangement/second set of wheels/first drive system, second direction Y
20a First wheel of second wheel arrangement 19
20b Second wheel of second wheel arrangement 19
20c Third wheel of second wheel arrangement 19
20d Fourth wheel of second wheel arrangement 19
21 Registration device/camera/sensor
22 Wheel arrangement protrusion for the first wheel arrangement 19
30 Rotational part of vehicle 3
30a Cantilever of rotational part 30/protruding section
30b Bulk section
30c Cantilever beams
30d Vehicle framework
31 Base/stationary part of vehicle 3
31a Top cover to base
32 Swivel device
33 Container receiving space
34 Rotational drive means/rotation activating motor
35 Control panel/transmission means
36 Top cover of rotational part
37 Front cover of rotational part 30/end section of the rotational part opposite the protruding section 30a
37 Back cover of rotational part 30
39 Vertical side covers of rotational part 30
40 Vehicle battery
40a Slot for replaceable vehicle battery
40b Battery opening in front cover for access to battery 40
41 Charging socket/coupling point for replaceable battery
100 Framework structure
102 Upright members of framework structure
103 Horizontal members of framework structure
104 Storage grid
105 Storage column
106 Storage container
106' Particular position of storage container
107 Stack
108 Rail system/track system
110 Parallel tracks in first direction (X)
110a First track of neighboring tracks 110

110b Second track of neighboring tracks 110
111 Parallel tracks in second direction (Y)
111a First track of neighboring tracks 111
111b Second track of neighboring tracks 111
112 Grid column
115 Grid opening
119 First port column/first port
120 Second port column/second port
122 Grid cell/storage cell
201 Prior art single cell storage container vehicle
201a Vehicle body of the storage container vehicle 101
201b Drive means/wheel arrangement, first direction (X)
201c Drive means/wheel arrangement, second direction (Y)
301 Prior art cantilever storage container vehicle
301a Vehicle body of the storage container vehicle 101
301b Drive means in first direction (X)
301c Drive means in second direction (Y)
X First direction
Y Second direction
Z Third direction
P Horizontal plane
R Rotational axis

The invention claimed is:

1. An automated storage and retrieval system comprising:
a track system comprising a first set of parallel tracks arranged in a horizontal plane and extending in a first direction and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks;
a plurality of stacks of storage containers arranged in storage columns located beneath the track system, wherein each storage column is located vertically below a grid opening; and
a vehicle configured to move on top of the track system above the storage columns, comprising a storage container lifting device for lifting storage containers stacked in the stacks and a drive system comprising a wheel arrangement, the drive system being configured to drive the vehicle along the track system in at least one of the first direction and the second direction,
wherein the vehicle further comprises:
a base onto which the wheel arrangement is connected,
a rotational part arranged on top of the base and rotationally connected via a swivel device to the base having a rotational axis directed perpendicular to the horizontal plane, the rotational part comprising a bulk section rotationally connected to the base and a protruding section extending horizontally in the first direction from the bulk section forming a container receiving space confined in height by a vertical distance from the track system to the protruding section and in the horizontal plane to a horizontal extent of the protruding section, wherein the storage container lifting device is arranged at least partly below the protruding section wherein the storage container lifting device is connected to a lower face of the protruding section, and
a rotational drive system for rotating the rotational part relative to the base.

2. The system according to claim 1, wherein the vehicle further comprises at least one camera allowing acquisition of live and/or still images.

3. The system according to claim 2, wherein at least one of the at least one camera is configured to allow acquisition of live and/or still images of content within a storage container.

4. The system according to claim 1, wherein the rotational part further comprises a registration device arranged at sides and/or beneath the protruding section wherein the registration device is configured to acquire information related to content within a storage container.

5. The system according to claim 4, wherein the registration device is connected to the storage container lifting device.

6. The system according to claim 4, wherein the registration device is a camera allowing live and/or still images of content within a storage container.

7. The system according to claim 1, wherein an end section of the rotational part opposite of the protruding section is shaped such that the rotational part may rotate without extending with the end section beyond a maximum horizontal extent of the drive system.

8. The system according to claim 1, wherein the rotational part further comprises:
a first protruding section extending horizontally in the first direction from the bulk section, forming a first container receiving space confined in height by the vertical distance from the track system to the first protruding section and in the horizontal plane to the horizontal extent of the first protruding section, and
a second protruding section extending horizontally in the first direction from the bulk section opposite of the first protruding section, forming a second container receiving space confined in height by the vertical distance from the track system to the second protruding section and in the horizontal plane to the horizontal extent of the second protruding section,
wherein the storage container lifting device is arranged at least partly beneath at least one of the first and second protruding section.

9. The system according to claim 1, wherein the drive system comprises a first wheel arrangement configured to guide the vehicle along the track system in the first direction,
wherein the first wheel arrangement has a length in the first direction being longer than the distance between a pair of neighboring tracks of the second set of tracks.

10. The system according to claim 9, wherein the drive system further comprises a second wheel arrangement configured to guide the vehicle along the track system in the second direction,
wherein the second wheel arrangement has a length in the second direction being equal to or shorter than the distance between a pair of neighboring track of the first set of tracks.

11. The system according to claim 1, wherein the vehicle further comprises a replaceable power source coupled to the rotational part.

12. A vehicle for lifting and transporting storage containers stacked in stacks within an automated storage and retrieval system including a track system, comprising:
a storage container lifting device for lifting the storage containers stacked in the stacks, and
a drive system comprising a wheel arrangement, the drive system being configured to drive the vehicle along the track system in at least one of a first direction and a second direction,
wherein the vehicle is configured to move on top of the track system above storage columns, the track system comprising a first set of parallel tracks arranged in a horizontal plane and extending in the first direction and a second set of parallel tracks arranged in the horizontal plane and extending in the second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks;

wherein the vehicle further comprises:
- a base onto which the wheel arrangement is connected,
- a rotational part arranged on top of the base and rotationally connected via a swivel device to the base having a rotational axis directed perpendicular to the horizontal plane, the rotational part comprising a bulk section rotationally connected to the base and a protruding section extending horizontally in the first direction from the bulk section forming a container receiving space confined in height by a vertical distance from the track system to the protruding section and in the horizontal plane to a horizontal extent of the protruding section, wherein the storage container lifting device is connected at least partly below the protruding section, wherein the storage container lifting device is connected to a lower face of the protruding section, and
- a rotational drive system for rotating the rotational part relative to the base.

13. A method of operating an automated storage and retrieval system, the automated storage and retrieval system comprising:
- a track system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks;
- a plurality of stacks of storage containers arranged in storage columns located beneath the track system, wherein each storage column is located vertically below a grid opening; and
- a vehicle comprising a storage container lifting device for lifting storage containers stacked in the stacks, a drive system comprising a wheel arrangement, the drive system being configured to drive the vehicle along the track system in at least one of the first direction and the second direction, a base onto which the wheel arrangement is connected, a rotational part rotationally connected via a swivel device to the base having a rotational axis directed perpendicular to the horizontal plane, the rotational part comprising a bulk section rotationally connected to the base and a protruding section extending horizontally in the first direction from the bulk section forming a container receiving space confined in height by a vertical distance from the track system to the protruding section and in the horizontal plane to a horizontal extent of the protruding section, wherein the storage container lifting device is arranged at least partly below the protruding section wherein the storage container lifting device is connected to a lower face of the protruding section, and
- a rotational drive system for rotating the rotational part relative to the base, wherein the method comprising:
- identifying a target storage container within a target storage column comprising the target storage container and at least one non-target storage container,
- operating the drive system to maneuver movement of the vehicle on top of the track system in the horizontal plane such that the storage container lifting device is arranged directly above the grid opening of the target storage column into which a selected target storage container is arranged,
- lifting a topmost storage container of the target storage column fully above the track system by use of the storage container lifting device,
- if the topmost storage container is a non-target storage container,
  - locating a non-target storage column onto or into which the non-target storage container may be arranged,
  - arranging the storage container lifting device with the non-target storage container directly above the grid opening of the non-target storage column by operating the drive system to maneuver the vehicle in the horizontal plane or operating the rotational drive system to rotate the rotational part, which is arranged on top of the base, relative to the base or a combination thereof, and
  - repeating the method steps involving the non-target storage container until the topmost storage container of the target storage column is the selected target storage container, and
- transporting the topmost storage container to a drop-off port within or adjacent to the track system.

* * * * *